United States Patent
Zhu et al.

(10) Patent No.: US 12,477,037 B2
(45) Date of Patent: Nov. 18, 2025

(54) DECENTRALISED AND TRUSTWORTHY LOGGING METHOD AND SYSTEM FOR DATA EXCHANGE TRACEABILITY

(71) Applicant: Kabushiki Kaisha Toshiba, Tokyo (JP)

(72) Inventors: Ziming Zhu, Bristol (GB); Timothy David Farnham, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 18/409,167

(22) Filed: Jan. 10, 2024

(65) Prior Publication Data
US 2025/0227147 A1    Jul. 10, 2025

(51) Int. Cl.
| | | |
|---|---|---|
| G06F 15/16 | (2006.01) | |
| G06F 21/64 | (2013.01) | |
| H04L 67/1097 | (2022.01) | |

(52) U.S. Cl.
CPC .......... H04L 67/1097 (2013.01); G06F 21/64 (2013.01)

(58) Field of Classification Search
CPC .................................................. H04L 67/1097
See application file for complete search history.

(56) References Cited

U.S. PATENT DOCUMENTS

| | | |
|---|---|---|
| 11,449,478 B2 | 9/2022 | Saurabh et al. |
| 2012/0291087 A1 | 11/2012 | Agrawal |
| 2019/0122258 A1 | 4/2019 | Bramberger et al. |
| 2019/0205429 A1* | 7/2019 | Lee .................. G06F 16/214 |
| 2019/0340623 A1 | 11/2019 | Rivkind et al. |
| 2021/0289033 A1* | 9/2021 | Ahuja ................ H04L 9/0637 |

FOREIGN PATENT DOCUMENTS

| | | |
|---|---|---|
| JP | 2020-610331 A | 4/2020 |
| JP | 2020-616968 A | 6/2020 |
| KR | 10-2208411 B1 | 1/2021 |

OTHER PUBLICATIONS

AWS Marketplace, https://aws.amazon.com/marketplace solution idata analytics, 12 pages.
Dawex, https://www.dawex.com/en/data-exchange-platform/data-marketplace/, 9 pages.
IDSA, https://internationaldataspaces.org/, 9 pages.

(Continued)

*Primary Examiner* — Yves Dalencourt
(74) *Attorney, Agent, or Firm* — Oblon, McClelland, Maier & Neustadt, L.L.P.

(57) ABSTRACT

A computer-implemented method of validating a data transfer from a data provider to a data user via a first computing node of a network is provided. The method comprises. The network comprises a plurality of computing nodes. The computing nodes are in communication with a distributed ledger storing, for each computing node, a respective reputation score derived based on previous data transfers associated with the respective node. The method comprises obtaining, by the first node, a data transfer record specifying the data transfer, and submitting, by the first node, the data transfer record to a smart contract on the ledger for validating the data record by determining that the reputation score of the first node exceeds a predefined threshold.

18 Claims, 5 Drawing Sheets

(56) References Cited

OTHER PUBLICATIONS

Ocean, https://market.oceanprotocol.com/, 7 pages.

Xu, Y. et al., "A Blockchain-Enabled Deduplicatable Data Auditing Mechanism for Network Storage Services," IEEE Transactions on Emerging Topics in Computing, vol. 9, No. 3, Sep. 16, 2021, pp. 1421-1432.

Debe, M. et al., "Blockchain-Based Energy Trading in Electric Vehicles Using an Auctioning and Reputation Scheme," IEEE Access, vol. 9, Dec. 23, 2021, pp. 165542-165556.

Aslan, U. et al., "GDPR Compliant Audit Log Management System with Blockchain," 2021 15th Turkish National Software Engineering Symposium (UYMS), 2021, 3 pages.

Ahmad, A. et al., "BlockTrail: A Service for Secure and Transparent Blockchain-Driven Audit Trails," IEEE Systems Journal, vol. 16, No. 1, Mar. 2022, pp. 1367-1378.

Japanese Office Action dated May 20, 2025, issued in Japanese Patent Application No. 2024-117567 (with English translation; documents 1, 16, 16 and 24 cited therein).

Jun Nakajima et al. "Blockchain based transaction log storage technology that realizes highly reliable data transaction." Institute of Electronics, Information and Communication Engineers Technical Report [online]. The Institute of Electronics, Information and Communication Engineers, Japan, Mar. 9, 2020, vol. 119, No. 482, SC2019 50, pp. 97 to 102.

\* cited by examiner

DECENTRALISED AND TRUSTWORTHY LOGGING METHOD AND SYSTEM FOR DATA EXCHANGE TRACEABILITY

FIELD OF THE INVENTION

The present invention generally relates to methods and systems for validating a data transfer, in particular to methods and systems for validating a data transfer using a distributed ledger.

BACKGROUND

Cloud-based data-sharing platforms help organizations to seamlessly share, buy, and sell data. These heavily virtualized, high-performance data platforms can be structured in a data-sharing-as-a-service model in which, for a fee, service subscribers can manage, curate, and tailor data.

Data exchange is an essential component/service of a data sharing platform to facilitate the buying and selling of data. It allows data providers to publish their data assets, and data users to browse, compare and collect data. The data exchange platform and the service providers usually operate with a centralised system administrator/server to handle the exchange activities in a secure, and reliable manner. The administrator serves as the point of trust, or a middle-man, establishing a trustworthy data trading relationship between the data provider (DP) and data user (DU). The administrator is responsible for providing essential data governance functions such as ID/access control, data exchange validation, and trusted record keeping for audit and traceability. The audit information includes transactional information such as account and payment details, as well as information about actual data exchange process, from what is agreed in the contract to what is happening in the actual data transfer over the communication link. Such information may include what and how much data are involved in the exchange, what data has been transferred, source and destination of data flow, communication link quality, time used for transmitting data, etc.

Arrangements of the embodiments will be understood and appreciated from the following detailed description, made by way of example and taken in conjunction with the drawings.

DETAILED DESCRIPTION

Figure 1:
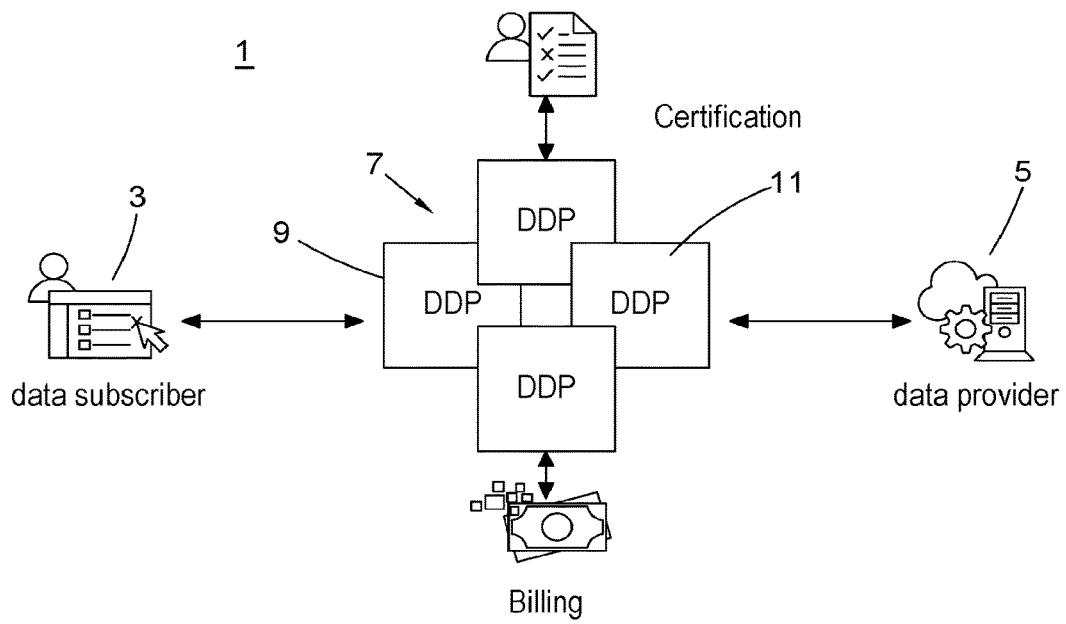
FIG. 1 is a schematic diagram illustrating a distributed data sharing system according to an embodiment.

According to an embodiment, there is provided a computer-implemented method of validating a data transfer from a data provider to a data user via a first computing node of a network comprising a plurality of computing nodes. The computing nodes in communication with a distributed ledger storing, for each computing node, a respective reputation score derived based on previous data transfers associated with the respective node. The method comprising obtaining, by the first node, a data transfer record specifying the data transfer and submitting, by the first node, the data transfer record to a smart contract on the ledger for validating the data record by determining that the reputation score of the first node exceeds a predefined threshold.

The ledger further may store, for each computing node, a respective data log specifying the previous data transfers associated with the respective node. The method may further comprise transmitting, by the first node, a request to the smart contract on the ledger for adding the validated data transfer record to the data log associated with the first node.

The method may further comprise, as initial steps, accessing, using a dummy user function, the ledger to inspect the data log of the first node, determining, by the dummy user function and based on the inspected log, whether to update the reputation score of the first node stored on the ledger, and conditional on determining to update the reputation score of the first node, invoking, by the dummy user function, the smart contract to update the reputation score of the first node based on the inspected log.

The data log may further specify a state for a data item involved in the previous data transfers. Determining whether to update the reputation score of the first node may comprise determining, by the dummy user function, whether the state of the data item indicates a request by the data provider to revoke access to the data item, and in response to determining that the state of the data item indicates the request, determining to update the reputation score to decrease the reputation score. Additionally or alternatively, determining whether to update the reputation score of the first node may comprise determining, by the dummy user function, whether the plurality of data items meet a similarity criterion, and in response to determining that the plurality of data items meet the similarity criterion, determining to update the reputation score to decrease the reputation score.

Obtaining the data transfer record may comprise monitoring, by the first node, a network traffic between the data provider to the data user via a data plane associated with the first node.

The data transfer record may specify one or more of contract information between the data provider and the data user, information describing data items involved in the data transfer, information describing a relationship with previous data transfers, information describing a data usage policy, a data transfer ID, a data transfer timestamp, a source and a destination IP address, and information describing a data plane performance.

According to an embodiment, there is provided a computer-implemented method of using a distributed ledger to validate a data transfer from a data provider to a data user via a first computing node of a network comprising a plurality of computing nodes. The ledger stores a respective reputation score derived based on previous data transfers associated with the respective node. The method comprises receiving, by the ledger, a data transfer record specifying the data transfer, and validating, by the ledger, the data transfer record, using a smart contract on the ledger by determining that the reputation score of the first node exceeds a predefined threshold.

The ledger may further store, for each computing node, a respective data log specifying the previous data transfers associated with the respective node. The method may further comprise receiving, by the ledger, a request, from the first node, to add the validated data transfer record to the data log associated with the first node, and adding, using the smart contract on the ledger, the validated data transfer record to the data log associated with the first node.

The method may further comprise, as initial steps, providing, by the ledger, to a dummy user function access to inspect the data log of the first node, and in response to receiving a request from the dummy user function, updating the reputation score of the first node based on the inspected data log.

The data log may further specify a state for a data item associated with the previous data transfers, and the state of the data item may indicate a request by the data provider to revoke access to the data item. Updating the reputation score of the first node based may comprise updating the reputation score to decrease the reputation score. Additionally or alternatively, the data log may further specify a plurality of data items associated with the previous data transfers. The plurality of data items may meet a similarity criterion. Updating the reputation score of the first node based may comprise updating the reputation score to decrease the reputation score.

The data transfer record may be generated by the first node by monitoring a network traffic between the data provider to the data user via a data plane associated with the first node.

According to an embodiment, there is provided a computing node comprising a processor and a memory. The memory stores instructions executable by the processor to implement the first or second embodiment.

According to an embodiment, there is provided a computer readable medium comprising executable instructions that, when executed by a processor, cause the processor to implement the first or second embodiment.

In overview, the present disclosure aims to overcome at least some of the drawbacks associated conventional data sharing platforms which rely on a centralised administration. In particular, the present disclosure proposes a data sharing system that provides audit and traceability functions without the need for a central administrator. Instead, the data providers and data users can establish a trust relationship directly with each other through consensus. The removal of the administrator reduces the administration overhead, and enables more flexible and cross domain (e.g. not limited to a particular vender of data plane or data platform) data exchange.

In broad terms, the present disclosure proposes embodiments that use a distributed ledger technology (DLT) based method to track and validate data exchange activities between data users and data providers, thereby providing a system of records approach to realise trusted record keeping and audit. In particular, the present disclosure describes methods for i) generating audit logs (i.e. logs that comprise, for example, details about the contract between data user and data provider, details about how the data is transferred, and the like), ii) validating the log creator/publisher, and iii) publishing and storing the logs (using a smart contract) on a distributed ledger. As described in detail below, embodiments may integrate a reputation based mechanism with DLT to deter untruthful logging.

FIG. 1 shows a distributed data sharing/exchange system 1 without a central administrator. The system 1 may be configured to enable a data user (DU) 3 to request and obtain data item(s) from a data provider (DP) 5 via the network 7. In general, the (distributed) network 7 comprises a plurality of computing nodes (also referred to as distributed data platform (DDP) nodes) and may be configured to implement a consensus based alliance of data exchange ecosystem participants. As described in detail below, the network 7 may perform administrative functions, for example creating data transfer records for auditing purposes.

A DDP node may be implemented as a respective computer program executed by one or more computers. A DDP node can typically interact with both DPs and DUs. In particular, each of the DDP node may comprise a data handling engine/core for handling data sharing/exchange requests from a DP and/or a DU. The DPs/DUs may be considered to be the "end users" of a DDP node. Further, a DDP node may be configured to collect, combine, and transmit data over a communications infrastructure (e.g. the internet) to the other DDPs. Thus, it is sufficient for a DP/DU to connect to only one DDP node to obtain access to the network (i.e. to be able to request and obtain data items from a DP connected to a different DDP nodes). Each DDP node may have an associated data plane that is configured to implement the transfer of data items from a DP to a DU (e.g. to route/forward data packets received from the DP to the DU). Different DDP nodes may have different associated data planes, i.e. the network 7 may form a "cross-domain" data sharing platform/alliance. Providing DDP nodes with different data planes, enables cross-domain data platform (or cross data space) auditing and traceability, and thus may encourage an increased data exchange in cross-domain scenarios, where a level of trust between data providers and users might below low.

In general, a DDP node may be configured to monitor and log any network traffic on its respective data plane. In particular, a DDP node may be configured to obtain (by monitoring the data plane) a data transfer record comprising information specifying a data transfer between a DP and a DU in which the DDP node is involved. To this end, a DDP node may comprise dedicated functions for logging network traffic on its data plane and for fetching the relevant log when needed (e.g. when a data exchange contract is agreed or a data transfer has happened). More specifically, a DDP node may comprise a data exchange control function configured to record information specifying a data exchange agreement (or contract) between the DP and the DU, for example a contract ID, a contract timestamp, actors or services involved in the contract (e.g. an IP address, a device ID, etc.), a contract description, a detailed description of the data item(s) involved in the exchange, a relationship with previous exchange/contracts, or the like. The detailed implementation of this function may vary between individual DDP venders.

Additionally or alternatively, the data exchange control function may record a data usage policy. The data usage policy may specify a policy for onward data handling and a requirement of further reporting by the DU, e.g. to maintain sufficient governance/control over the data items by the original data owner/provider.

The DDP nodes may further comprise a transfer phase recording function for recording information during a data transfer phase. For example, this function may record a data transfer ID, a corresponding data exchange contract ID, a data transfer timestamps, a source and a destination of the data transfer (e.g. an IP address, a device ID, etc.), a detailed description of the transferred data (e.g., a data item ID, such as a concatenation of the resource URL and the UUID for the DP, a data plane query, a data fingerprint, watermarks, and the like), a data plane performance metric (e.g. a data rate), side information or custom tags as required in the usage policy of the current and previous data exchange contracts.

The information recorded by a DDP node (e.g. by the data exchange control function and/or the transfer phase recording function) may be accessed (e.g. fetched), as a data transfer record, through an application programming interface (API) by a log creator function (log creator for short) of the DDP node.

Referring to FIG. 1, the DU 3 is in communication with a first DDP node 9, and the DP 5 is in communication with a second DDP node 11. For example, the DU 3 may decide to purchase a data item offered by DP 5, and may therefore send to the DDP node 9 a request for the particular data item. The DDP node 9 may then forward the request to the DDP node 11 to facilitate the data transfer. While in the embodiment of FIG. 1, the DP 5 and the DU 3 communicate with different DDP nodes, it is understood that in other embodiments the DP 5 and the DU 3 may communicate with the same DDP node.

The network 7 may be further configured to have access to a distributed ledger, i.e. each of the DDP nodes (e.g. DPP nodes 9, 11) is configured to access (i.e. to read from and/or write to) the ledger. The distributed ledger may be configured to store a transfer history log (data log for short) specifying previous data transfers performed via the network 7. In general, the purpose of the data log is to provide traceably and auditable records of data transfers associated with network 7. The distributed ledger may store, for each DDS node, an individual data log specifying the previous data transfers associated with the respective DDS node.

In general, the distributed ledger may also host a smart contract (or multiple smart contracts) for implementing logic/functions. The term "smart contract" may refer to a self-executing application stored and executed on the distributed ledger. For example, the smart contract application may be used to write/read data onto/from the ledger. Thus, the smart contract application may provide data stored on the distributed ledger to (authorised) clients/applications. In particular, the smart contract may implement the necessary logic/functions for implementing the reputation based validation methods described below.

The distributed ledger may be implemented as a permissioned blockchain network, or in any other known and suitable way. The distributed ledger may be hosted by the DDP nodes (i.e. the computing nodes of the network 7 that implement the DDP nodes may also implement nodes of the distributed ledger). In other embodiments, the distributed ledger may be hosted on a separate distributed computing network which is in communication with the network 7 to allow the DDP nodes to access the ledger.

The log creator of a DDP node may fetch a data transfer record (e.g. when a data transfer happened) and may submit the record to the ledger so that (if successfully validated as described below) the data transfer record is added to the data log stored on the ledger. In this way, the data log forms an auditable log of the transfer history that is accessible to all clients/users of the distributed ledger. This is in contrast to conventional DLT based audit logging methods in the field of data sharing that lack the ability of providing a trusted record of physical events. For example, conventional DLT based methods for logging financial transactions of data trading are not capable of verifying data flows (e.g. transfer of data item such as a data file) from a DP to a UP.

In broad terms, to build trust in the data log stored on the ledger, each data transfer record may be validated before being allowed to be added to the data log. This may be done by checking a level of trustworthiness or reputation associated with the entity (i.e. a particular DDP nodes) that submits a data transfer record to the ledger. If a validation attempt fails (e.g. because an earlier event/dispute caused a decrease in a DDP node's reputation, as described below in detail), the data transfer may not be added to the ledger. Further, the corresponding DDP node may be suspended from participating in the data exchange system 1 (e.g. until the DDP node performs an action to recover its level of reputation). Aspects of implementing such reputation based validation methods are now described.

The distributed ledger may also store a reputation score for each DDP node. In general, the reputation score may indicate a level of trust associated with a particular DDP node. For example, the reputation score for a DDP node may be {0, 1, 2, . . . }, where a higher numerical value indicates a better reputation of the DDP node. Since the reputation score is stored on the distributed ledger, all clients of the ledger can typically access the reputation scores of all DDP nodes. The smart contract (on the distributed ledger) may be configured to implement the necessary logic/functions to create and change reputation scores on the distributed ledger, and to facilitate synchronisation of the member nodes of the distributed ledger. As described below with reference to FIGS. 2-4, the smart contract may be configured to receive a data transfer record from the log creator of a DDP node for validation and to add validated transfer records onto the distributed ledger.

It is understood that the distributed ledger may store the reputation score for each DDP node in any suitable way. For example, in an embodiment, the distributed ledger may store (additionally or alternatively to the above described reputation scores for each DDP node) individual reputation scores for each of the offered resources so that the reputation score of a particular DDP node can be computed based on the reputation scores of the resources offered by said DDP node (e.g. by averaging the corresponding individual resource reputation scores). This may be advantageous in that reputation can be validated on both a resource level and on an overall DDP node level. For example, this may be useful when subsets of offered resources have low reputation as this provides a DDP node with useful information for improving its overall reputation (e.g. by removing offered resources with low reputation).

The reputation score of a particular DDP node may be calculated based on historical data exchange activities of the DDP node (for example by a reputation scoring function comprised in the smart contract application). The reputation score of a particular DDP node may be (automatically) updated when a logging event regarding to the respective DDP is completed (e.g. when a data transfer record submitted by the DDP nodes has been added to the data log).

The reputation score may be further (regularly) updated based on "user side" feedback provided by a Dummy Data User (DDU), as described in detail below. Thus, the reputation score may also be updated when a feedback from a DDU is received.

It is understood that the smart contract application may be configured to perform further logic/functions for implementing proper operation of the ledger. For example, the smart contract application may be further configured to perform an ID check to ensure that the smart contract can only be accessed (or invoked) by registered clients of the distributed ledger.

The ledger may also store a product state associated with a data item (or a transfer ID) within the data sharing/exchange process. For example, a DP may request from a DDP node to store on the ledger a product state associated with a particular data item offered by the DP. The product state may be created (and updated) by using the smart contract on the ledger. For example, the product state of a data item may be one of {original, copy, split, ship, receive, inspected, labelled, sold, revoked, etc . . . }. A respective state value may be updated by the smart contract logic when a new data transfer event is logged, or when a validation feedback from the DDU is received (as described below with reference to FIG. 5). In general, the logic/rules of state changes may be defined in a state machine within the smart contract.

A DDP node may implement a dummy data user function (DDU for short) to inspect the ledger to provide feedback for updating the reputation scores. This means that based on the content of the ledger, the DDU may determine that the reputation score of a particular DDP node should be updated (e.g. reduced or increased) and may invoke the smart contract so as to update the reputation score accordingly. The DDU may be configured to update the reputation scores of DDP nodes other than the DDP node associated with the DDU. The smart contract rules may be used to prevent self-updating (i.e. to prevent a DDU from updating the reputation score of the DDP node that implements the DDU).

The DDU may be implemented as a separate client (i.e. the DDU may have a different DLT client ID from the client ID of the DP/DU), and may be activated to request dummy transactions with the DDP node (thereby invoking the smart contract) to inspect the ledger. During a dummy transaction there is no substantial data transfer/flow since the dummy transaction happens inside the same DDP node. As a consequence, the use of the DDU does not violate common data usage/governance policies.

The DDU may be activated according to a policy (set by the alliance of data exchange ecosystem participants or by the DDP node administrator), for example according to a schedule or on demand (e.g. triggered by a predefined event). Details of the policy for activating the DDU may be kept private, however it is understood that permission of using the DDU is given by the alliance. Records of the dummy transaction may also be recorded onto the distributed ledger (and thus accessible by other clients of the ledger).

Inspecting the ledger by the DDU to provide feedback for updating the reputation scores may comprise inspecting the data log and/or the states of the data items. Two specific examples of how the DDU can derive updates to the reputation scores are described below with reference to FIGS. 6 and 7. It is however understood that the DDU can derive reputation score updates in a number of ways depending on the specific application. For example, the DDU may determine a (recent) change in a product state of a data item that indicates a dispute, or a correlation between data items of separate DPs that indicates a duplicated data item. In another example, the DDU may determine that the DDP node manipulated the original record (e.g. to mask details such as origin, ownership, etc. of the data item) before submitting the data transfer record to the smart contract.

In an embodiment, appropriate DDU validation logic may be (partly) a hardcoded function/logic within in the smart contract so as to inspect the content of submitted data transfer records when the smart contract application is called during a logging process (as described below with reference to FIG. 4). Generally, the validation policy may be public (i.e. known to all members to the distributed ledger) and may be automatically executed as it may be hardcoded into the chaincode.

In broad terms, knowing that a public record and a mechanism for post-event validation exits, might deter the members of the distributed data exchange system 1 from untruthfully publishing/logging their own data transfer events.

Figure 2:
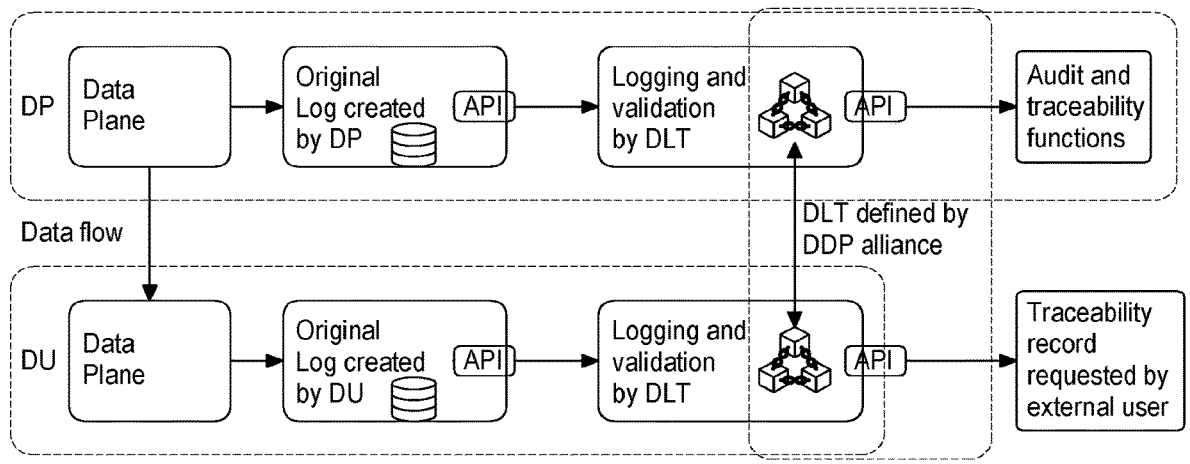
FIG. 2 is a block diagram illustrating a distributed audit function according to an embodiment.
Figure 3:
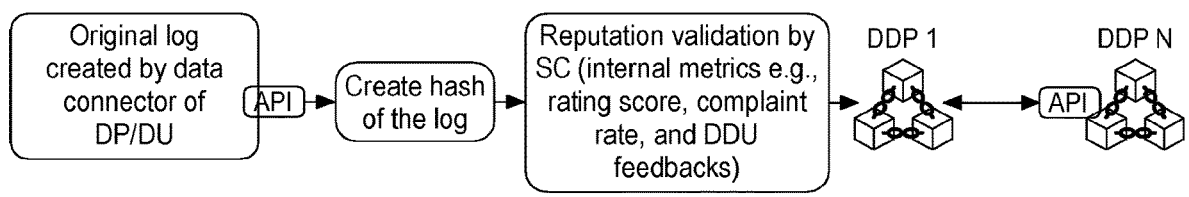
FIG. 3 is a block diagram illustrating a logging process according to an embodiment.

An example method of logging and validating a data transfer between the DP 5 and the DU 3 is described with reference to FIGS. 2-4. FIG. 2 is a block diagram illustrating a data plan flow between various components of the system 1. FIG. 3 is a block diagram illustrating details of the validation process. FIG. 4 is a flow diagram of the example method.

In broad terms, each DDP node monitors its respective data exchange activities, and reports and verifies the data exchange activities by a consensus process of the distributed ledger, so that all DDP nodes have access to synchronised and verified information about the data exchange. Further, except for minimal central administration at the DDP alliance level, for example, for defining a usage policy and for managing access to the distributed ledger, the creation and updating of the data log stored on the distributed ledger is fully distributed among DDP nodes.

Figure 4:
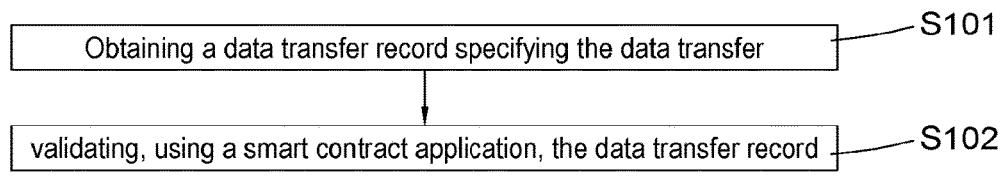
FIG. 4 is a flow diagram of a process of validating a data transfer using the distributed data sharing system of FIG. 1.

Referring to FIGS. 2-4, in an initial step S101, the DDP node 9 obtains a data transfer record specifying the data transfer (e.g. by logging network traffic on its data plane as described above). More specifically, the log creator of DDP node 9 may fetch (or receive) the corresponding data transfer record, for example in response to a completion of a data transfer from DP 5 to DU 3. The log creator component may then process the respective data transfer record by a hashing operation using a form of Secure Hash Algorithm (SHA), before submitting the hashed record to the smart contract for validating the record (and adding the record to the distributed ledger), as shown in FIG. 3. The hashing process may be implemented using any known suitable method, and may be selected based on data exchange requirements for protecting sensitive information and privacy. Generally, the hashing process may provide sufficient granularity to separate the individual parts of the data transfer record, e.g., by creating a separate hash value for the 'description of data' part. As illustrated in FIG. 2, a similar process may happen in DDP node 11, i.e. the log creator of DDP node 11 may fetch a corresponding data transfer record, and perform a hashing operation.

In step S102, the DDP node 9 submits the (hashed) data transfer record to the smart contract on the distributed ledger for validating the data record. More specifically, the log creator component of the DDP nodes 9 may be a user/client of the smart contract and may provide the data transfer record as input to the smart contract application.

The smart contract may validate the received data transfer record by determining that the reputation score of the DDP node 9 exceeds a predefined threshold value. To this end, the smart contract may read from the distributed ledger the respective reputation score for the DDP node 9 and compare the reputation score with the threshold (the threshold value may also be stored on the ledger). Then, the smart contract may determine that the data transfer record submitted by the DDP node 9 is valid if the reputation score of the DDP node 9 exceeds the threshold. Broadly speaking, the data transfer record may be found valid because it has been submitted by an entity with a (sufficiently) high reputation. Similarly, the smart contract may determine that the data transfer record submitted by the DDP node 11 is valid if the reputation score of the DDP node 11 exceeds the threshold.

If the smart contract determines that the submitted data transfer record is valid, the smart contract inputs the data transfer record to the ledger (i.e. adds the data transfer record to the data log). The smart contract may update the respective reputation score based on the successful validation of the data transfer record (i.e. the smart contract may increase the respective reputation score in response to a successful validation). In an embodiment, the smart contract may also update the product state associated with the relevant data item based on the successful validation.

In an embodiment, when (part of) the DDU logic is written within the smart contract, the data transfer record may also pass the corresponding function to be published onto the ledger. This may be integrated with the permission mechanism in a conventional DLT system.

If reputation score is below the threshold value, the corresponding DDP node may be (temporarily) suspended from interacting with the distributed ledger (i.e. suspended from future data transfer activity). The DDP node may be banned from data exchange activities, until its reputation score recovers. The reputation score may recover, for example, by the feedback provided by the DDU, by an overwrite/reset by permission of the alliance, or any other suitable criteria such as a paying a fine, a provided external trustee/insurance, etc.

Thus, the above described distributed data sharing/exchange system 1 may reduce overhead costs associated with conventional data sharing system relying on a central administration. Further, as described above, the system 1 enables validation and inspection of the contents to be stored on the ledger without relying on external source of truth/trusted third parties. Further, the risk that a DDP node hides information from the data transfer record, or modifies the original record (e.g. to mask details such as origin, ownership, etc. of the data item) before publishing the record onto the ledger is reduced since the DDU can detect such behaviour and reduce the reputation score of the relevant DDP node so as to prevent the DDP node from further data exchange activities.

Examples of specific implementation details of some aspects of the above methods are now described. As described above, the ledger may store data logs and product states associated with data items exchanged via the network 7. In one embodiment, this may be implemented by providing logic within the smart contract for creating (and updating) corresponding data objects. The provided logic may allow creating smart contract entries for each resource and subscription to a resource. For example, a data item offered by a DP may be represented in the data log as a "resource" data object with attributes as described in Tables 1 and 2 below.

TABLE 1

Resource attributes

| Attribute | Description |
|---|---|
| State | Current state of the resource/subscription |
| UserID | Data User ID for the subscription |
| ParentID | Parent resource ID for the resource/subscription |
| Reputation | Reputation score for the resource |
| Version | Version of the resource data plane |
| Type | Type of resource data plane |
| History | State history attributes recorded for each state |

TABLE 2

State attributes

| Attribute | Description |
|---|---|
| Timestamp | State update date/time |
| Policy | Policy relevant to the state change such as reputation score threshold |

TABLE 2-continued

State attributes

| Attribute | Description |
|---|---|
| url | URL of the resource |
| Uuid | UUID of the resource |
| Name | Name of the resource |

Figure 5:
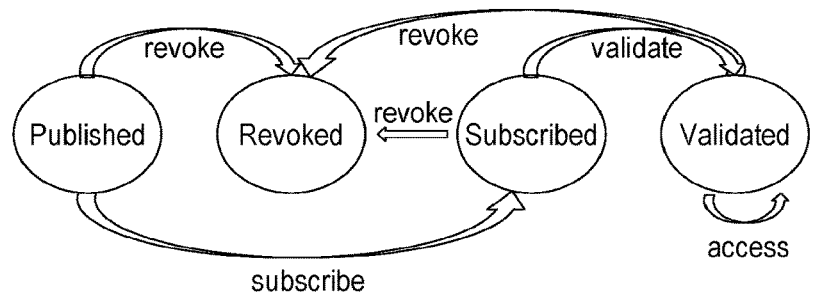
FIG. 5 is a block diagram illustrating a state machine.

Thus, in this example the resource object has the attribute "state" specifying a state of the corresponding data item. The value of the state attribute may be changed according to a state machine model. FIG. 5 illustrates an example state machine representation for the state attribute of a resource object. The Table 3 summarises the corresponding permitted actions. As can be seen in Table 1, the resource object also has a "history" attribute in which previous state values are logged.

TABLE 3

Permitted action

| Action/role | From - state | To - state |
|---|---|---|
| 'publish' | '*' | 'published' |
| 'subscribe' | '*' | 'subscribed' |
| 'validate' | 'subscribed' | 'validated' |
| 'access' | 'validated' | 'validated' |
| 'revoke' | '*' | 'revoked' |

For example, a DDP node may identify (by monitoring its data plane) a new data item that a DP offers. After successful validation (as described above), the DDP node may invoke the smart contract to create a new resource data object (as part of the data log stored on the ledger). The "state" of the resource object may be initiated in the published state. As can be seen from Table 1, the resource may be specified by a data plane URL and a resource ID. The name and policies regarding conditions of use may also be passed into the state machine. The resource may have an associated reputation score attribute. The reputation score of an offered resource may be initiated with the reputation score of the DDP node to which the DP is connected. This permits reputation to be validated on both a resource level and on an overall DDP level. The reputation score of a particular DDP node may depend on the individual reputation scores of the offered resources from that DDP node.

Similarly, the smart contract may comprise logic to create for every resource object representing a data item provided by a DP a corresponding subscription object that represents a subscription to a particular data item (by a DU). The reputation of the resource subscription object may be initially inherited from the parent resource (i.e. the object representing the data item), i.e. the parent resource must exist in the audit chain. The ID of the resource may be appended with the URL or the data user data plane end point to create a unique subscription ID. The state machine may be initiated in the subscribed state.

The smart contract may comprise logic to upstate the state machines, i.e. to make a transition from one state to another on a resource or subscription state machine. The permitted transition activation for the "revoke" action may be such that this action can only be performed by a DP and that the action is applied to both resources and subscriptions. The permitted transitions for the other actions may be such that can be performed only by DUs. The DDU may be a special user that can perform the "validate" action.

When the revoke action is invoked for a resource, the revoke action may also be invoked (by corresponding logic in the smart contract) for all subscriptions to the resource, any child resources associated with the resource, and any other derived products. In this manner all access to the associated resources will be blocked.

The access action may control access to the corresponding data plane API and may only be performed in the validated state, a data item may not be used before the corresponding resource subscription object is validated. More specifically, the access action may be performed to obtain the necessary access tokens to access the data plane APIs. This may verify the state of the resource before issuing the necessary access tokens, such as JSON Web tokens. Tokens may only be issued if the subscription to the resource is in the validated state.

Figure 6A:
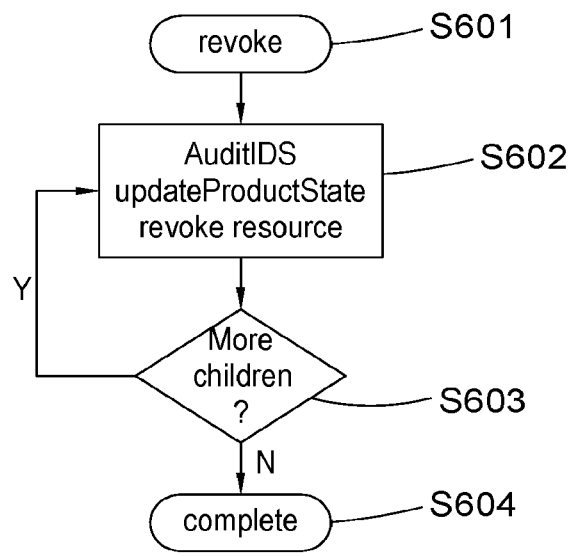
FIGS. 6A-B and 7 are flow diagrams of example methods for updating a reputation score using a dummy data user.
Figure 6B:
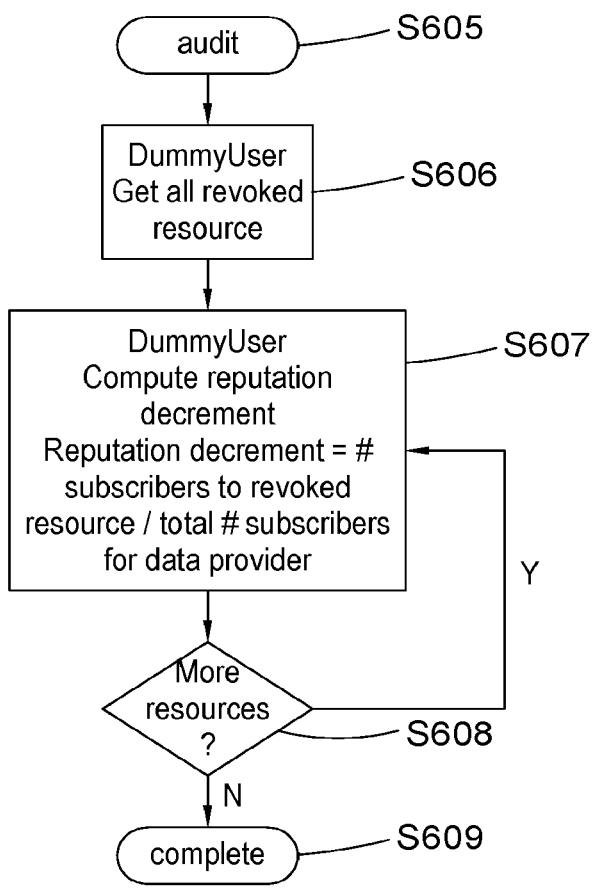

With reference to FIGS. 6A-B, an example method is described for updating a reputation score, using a DDU, in response to a revocation of access to a resource. FIG. 6A is a flow diagram illustrating a process triggered by invoking a revoke action. In an initial step S601, a DP determines that access to a data item offer by the DP needs to be revoked. This may occur for different reasons, such as a dispute or recall due to a GDPR request or other related reasons. In such a case, the DP communicates with a DDP node to request a revocation of the data item.

In step S602, the revoke operation is performed by the smart contract, and the state of the resource object is changed to "revoked". This initiates a revoking of all resources and subscriptions associated with that parent resource. Accordingly, in step S603, it is determined whether a child or subscription object exists, and if so step S602 is performed for the corresponding object. When all subscriptions and children objects are revoked, the process is completed (S104).

Next, a DDU may perform an update of all the corresponding reputations based on the number of associated resources impacted by the revocation, as described in the following with reference to FIG. 6B. Thus, in step S605, the DDU is activated to inspect the ledger and update the reputation scores. As mentioned above, this may happen based on a schedule or based on an event (e.g. the DDP node may activate the DDU after receiving a revoke request from a DP).

In step S606, the DDU gets from the ledger (a list of) all resources with a state attribute "revoked". Since a revocation is typically caused by a negative event like a dispute, the DDU may determine to lower the associated reputation scores. Thus, in step S607, the DDU computes for each of the relevant resources an update of the respective reputation score. For instance, the updates may be determined based on the number of impacted subscribers or the total number of child resources utilising the parent resource.

In an embodiment, the reputation score update may be computed based on a reputation decrement factor given by Reputation decrement = subscribers to revoked resource/total # subscribers for data provider, and a reputation decrement weight given by Reputation weight = length of time until resolution/acceptable resolution time.

The overall score adjustment may then be computed as the product of reputation decrement and reputation weight. This decrement may be applied for each "acceptable resolution time"-cycle. Further, in step S607, the DDU invokes the smart contract to update the reputations score, i.e. to update the respective values of the "reputation" attribute of the relevant resources. More specifically, the dummy user may (via the audit chain code, i.e. the smart contract) update the reputation of all resources of DPs associated with resources with revoked resources (i.e. the DDU may not only lower the value of the reputation attribute of the revoked resource but also other resources of the same DP. As a consequence, subsequent subscriptions to resources associated with the same data providers may not be permitted since the reputation threshold condition may not be met. In step S608, the DDU determines whether further resources need to be updated (e.g. resources of an "onward selling" DP, i.e. a DP who offers a data item that incorporates a data item originally provided by another DP who revoked the data item in question), and if so performs step S607 for these resources. Otherwise, the process is completed (S609).

In broad terms, the above process encourages rapid resolution of disputes (and similar issues) that can affect many subscribers as a DP can lose access to the marketplace as the reputation reduces. These reputation updates are performed automatically by the DDU to ensure independence and avoid interference in the process.

The above process also enables (automatic) handling of supply chains of data resources which can include onward selling chains. For example, a DP that uses data provided by another DP in its onward product will also be impacted by the reputation scoring updates. In an embodiment, the onward selling DPs may have lower reputation decrements applied compared with the original DP of the resources that are revoked (for instance, only 10% or 25% of the decrement). In this way, the loss of reputation resulting from unwittingly using a seemingly trustworthy resource from a DP can be controlled to ensure a level of fairness.

A particular advantage of the process described with reference to FIGS. 6A-B is that the reputation score is directly updated (based on the revoking of access) to the data resources which can also further be the derived data resources. In this way, the reputation score can encourage trustworthy data supply chains, and at the same time high availability (i.e. rapid resolution) in a fully decentralised manner across different domains.

Figure 7:
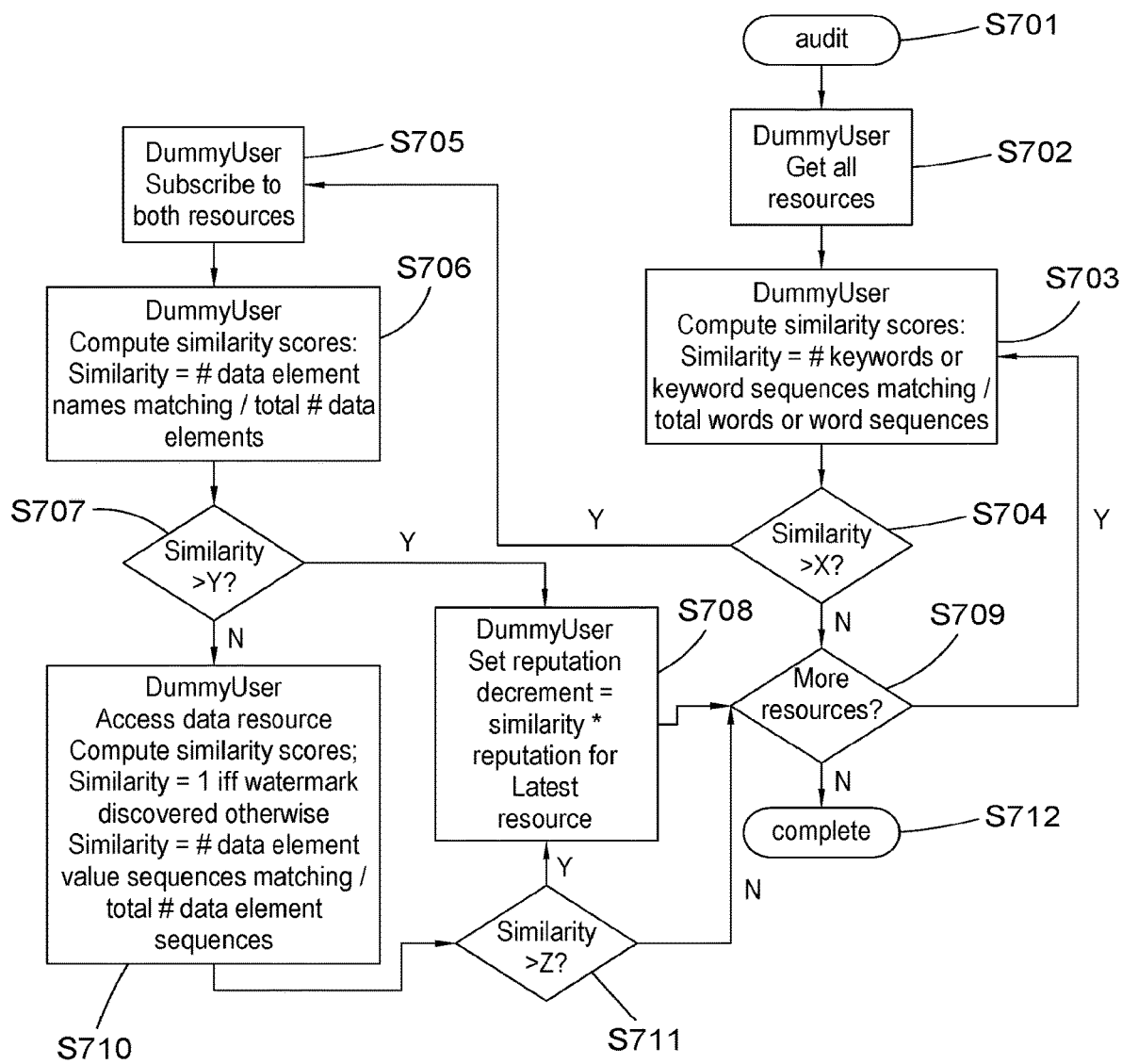

With reference to FIG. 7, a further example method for updating a reputation score is described. Broadly speaking, this method may be enable i) the detection of onward selling without the acknowledgement of the original data provider, and ii) the reduction of the reputation scores of the onward seller.

In general, the smart contract may comprise logic that enables onward selling of data items so that the original data provider is acknowledged. For example, the smart contract may comprise a "combine" operation which allows creating a new resource object from an existing resource object (respectively referred to as "child" and "parent" resource). In this case, the child's reputation score may initially be propagated from the parent resource.

For instance, a "trustworthy" DP may use the "combine" operation on a data resource that uses data from another resource. This may insert the corresponding child resource IDs into the existing parent resources on creation of the new resource state machine within the audit chain.

If, however, a DP does not acknowledge this prior resource as an input to the onward product, the DDU may detect such an omission and may lower the reputation score of the DP accordingly, as described in the following with reference to FIG. 7. In an initial step S701, the DDU is activated to inspect the ledger (as described above in S605). For example, the DDU may be periodically activated. In step S702, the DDU receives multiple resource objects (i.e. resources in the "published" state), for example all resource objects on the ledger, or all resource objects associated with DPs in communication with a particular DDP node.

In step S703, the DDU computes a first similarity score for each pair of objects within the plurality of resource objects. The similarity scores may be determined based on criteria such as publication dates and/or data resource description (e.g. keywords describing the resource offerings) within the metadata (e.g. similar to conventional plagiarism detection based on keyword and word sequence matching).

In step S704, the DDU determines whether the plurality of resource objects meet a first similarity criterion (to determine if there is potential for onward selling) by determining whether any of the first similarity scores exceeds a threshold value. For example, the threshold value may be 40% (i.e. when the first similarity score exceeds 40%, the relevant resources may be further investigated by proceeding to step S705, otherwise the relevant resources are no further investigated and the process proceeds with S709). In an embodiment, to protect legitimate onward selling, meeting the first similarity criterion may further require that a potential parent resource does not include the data resource ID entry of the potential child resource (since this indicates legitimate onward selling via the combine operation).

If a first similarity score exceeds the threshold (S705), the DDU subscribes to the relevant resources to obtain further information. In step S706, the DDU computes a second similarity score for the relevant pair of resources based on the ratio of data parameters (e.g. names of data elements associated with the resources) that are the same in both resources:

Second Similarity Score = data element names matching/total # data elements

Thus, advantageously, the first and second similarity scores may be computed from the information stored on the ledger, i.e. without the need for DDU to access the actual data.

In step S707, the DDU determines whether the second similarity score exceeds a corresponding threshold value. For example, the threshold for the second similarity score may be 80%. If the second similarity score exceeds the corresponding threshold, the data elements are considered to be sufficiently similar to proceed with adjusting the relevant reputation and the DDU computes, in step S708 a reputation decrement for the resource that has been created last (since the earlier created resource is the original resource). The decrement may be computed according to Reputation decrement = reputation * similarity, where "similarity" is either the first, the second or a combination of the first and second similarity score. Then, the DDU may invoke the smart contract to update the reputation score accordingly.

Thus, in this way, the update of the reputation may take into account the likeliness of that the later created resource is indeed an unacknowledged onward sale. By periodically updating the reputation, the DDU can also permit an acceptable resolution time prior to performing the reputation score updates. Hence, once notified the DPs have one "acceptable resolution time" period in which to perform the necessary combining operations to acknowledge the onward selling or to revoke the data resource offering.

In step S709, the DDU determines whether the similarity of further resources need to be determined, and if so performs step S703 for these resources. Otherwise, the process is completed (S712).

In an embodiment, the method further comprises steps S710 and S711, i.e. if the DDU determines in step S707 that the second similarity score is not exceeded, the method may proceed with step S710. In this step, the relevant data items are inspected to determine a third similarity score. For example, the third similarity score may be determined based on detecting matching data element values or matching sequences of elements, e.g.

Third Similarity Score = data element values matching/total # data element elements, or

Third Similarity Score = data element value sequences matching/total # data element sequences.

Alternatively, the third similarity score may be determined based detecting the presence or absence of specific known data water marks, for example known sequences or data element values that would not normally be expected to occur. Such water marks can be synthetic or adjusted data element values that intentionally do not match with ground truth reality. For instance, for data elements that correspond to timestamps, the date and times can be adjusted by predetermined and known amounts from the actual timestamps of occurrence. In this manner the correlation score between the resources can be determined with certainty in a binary manner (i.e. 0 or 1, where 1 indicates the presence of the water mark in the relevant resources) based on discovery or not of the embedded water marks.

In step S111, the DDU determines whether the third similarity score exceeds a corresponding threshold value. For example, the threshold for the third similarity score may be 10%. Thus, if the third similarity score exceeds the corresponding threshold, the process continues with step S708 as described above (i.e. with adjusting reputation since it is likely that portions of the original data have been copied into the later offering).

The method described above with reference to FIG. 7 may have an effect of reducing reputation of data provider resources that are very similar, which is typically a desired outcome as a marketplace that contains many similar products ultimately has less value to data users and becomes more of a commodity marketplace. Hence, encouraging more diverse data products (as described above) is generally desired.

Figure 8:
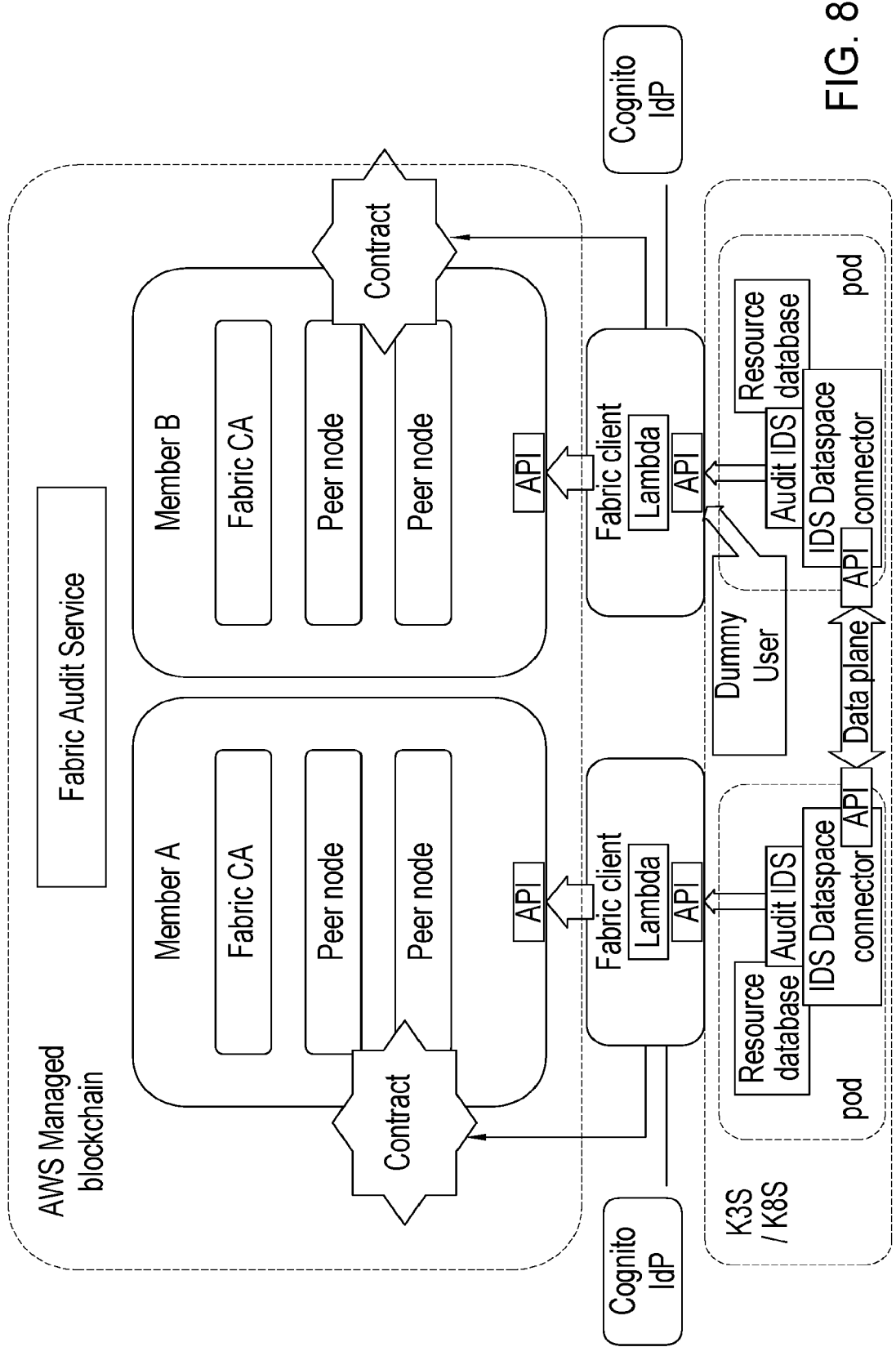
FIG. 8 is a block diagram of an example implementation of the distributed data sharing system of FIG. 1.

FIG. 8 is a block diagram illustrating a specific implementation of the distributed data sharing system of FIG. 1. It is understood that the embodiment of FIG. 8 is only a (simple) example, and that the system of FIG. 1 can be implemented in number of different ways. In particular, any references to specific, commercially available software tools are made solely for providing a better understanding of how some of the features described above may conveniently be implemented in practice, and are not intended to limit the scope of protection.

The embodiment of FIG. 8 comprises a Hyperledger DLT approach (built on an AWS managed blockchain). The system uses the International Data Spaces Association (IDSA) Dataspace connector reference implementation (the IDSA provides standardised mechanisms for distributed data sharing including support for different data planes and auditing). Thus, this embodiment incorporates a conventional data plane that can be registered and used via a conventional API.

Within the blockchain are two members that represent different organisations and are associated with two separate AWS accounts. The Member A publishes the chaincode that is used for validating and storing the state data for the smart contracts and Member B approves the use of the chaincode for the channel. Subsequently, the access to the chaincode is authorised based on the embedded policies which specifies action/roles and member types (DP and DU/DDU) required to perform operations. The Cognito IdP user groups provide the permissions associated with the users that can access the fabric through the GraphQL API provided by the Lambda function and exposed through the fabric client API. In this way, AuditIDS instances in the data IDS connector pods can access the fabric audit service.

To incorporate the IDS connector approach into the above described DDP node-based distributed data marketplace, control plane interactions are provided (IdP based DDP registrations, publishing APIs by data providers and subscriptions by data users and auditing). In addition, the IDSA dataspace connector may provide optional contract negotiation steps which can complement the DDP API subscription and monetisation within the control plane. These can define the terms and conditions of the data handling in the form of policies and assist in the selection of data provider/data plane. The additional auditing function provides logging support for data sharing between a DP and a DU, and data usage according to Usage Contracts or Data Usage Policies. This may be useful for dispute resolution, billing and for providing an indisputable and immutable audit trail. As described above, the auditing is implemented using DLT based approach with smart contracts using hashing and operation validation to permit decentralisation to eliminate the need for a trusted central storage services or oracles.

In the embodiment of FIG. 8, the IDS dataspace connector is a component that provides the data plane functionality and supports the integration with auditing, identity and broker as well as App store functionality. It is understood that these additional components are optional, e.g. these components are not required if the functions are either supported via the API manager (or are simply considered not to be necessary as a matter of design choice). For instance, it may be possible to register the data connectors and provide marketplace integration using the API manager. Thus, in this way similar App store and auditing functions can also be partly or fully provided through the API manager integrated functions.

The dataspace connector can be combined with an AWS Hyperledger based audit and validation smart contract function. This permits the recording and validation of each data resource subscription and use or access as described above with reference to FIGS. 5 and Tables 1-3. The auditing is performed within the distributed ledger smart contract code, which may be exposed though a graphQL API providing the above described functions (e.g. for creating resource and subscription objects) which validate and record the resource publication, access requests on the smart contract and perform the necessary checks to determine if the operations are permitted.

The AuditIDS implementation may use the graphQL API exposed by the fabric client lambda function. This permits the invoking of chaincode operations according to the permitted actions as described above with reference to Table 3. The graphQL operations may be mapped directly to the chaincode by the lambda function and may also permit querying of the state machine database state. This allows the AuditIDS and DDU to observe the changes in resource state information.

The AuditIDS code may enable the asynchronous observation of changes in the resource table of the data plane connector database (connectordb) and update the chaincode accordingly. For example, each time a change occurs in the resource table of the IDS connector instance, the AuditIDS associated with that connector performs the update of the corresponding audit operations via the graphQL API. For instance, when a new offered resource entry appears in the IDS connector the corresponding graphQL is used to update the audit chain using the "create resource object" operation.

Cognito IdP may be used as an identity provider for managing access to the managed APIs. The IdP stores users within a user pool/group and their corresponding permissions to perform actions of the audit fabric. Therefore, each domain (fabric member) can control what actions users are permitted to perform in their member domain, so the AuditIDS to perform the necessary operations it must use a role which has permissions for those operations. The DDU needs special permissions for allowing the updating of reputations. The IdP issues JWT access tokens which permit the corresponding graphQL API operations on the fabric clients.

Thus, the embodiment of FIG. 8 may be used to implement the methods described above with reference to FIGS. 1-7.

While certain arrangements have been described, they have been presented by way of example only, and are not intended to limit the scope of protection. The inventive concepts described herein may be implemented in a variety of other arrangements. In addition, various additions, omissions, substitutions and changes may be made to the arrangements described herein without departing from the scope of the invention as defined by the following claims.

The invention claimed is:
1. A computer-implemented method comprising:
obtaining, by a first computing node of a network, a data transfer record specifying a data transfer from a data provider to a data user via the first computing node, the network including a plurality of computing nodes, the computing nodes being in communication with a distributed ledger storing reputation scores derived based on previous data transfers associated with the computing nodes, the reputation scores corresponding to the computing nodes;
submitting, by the first computing node, the data transfer record to a smart contract on the distributed ledger for validating the data transfer record, the smart contract including a self-executing application stored and executed on the distributed ledger, the distributed ledger further storing data logs specifying the previous data transfers, the data logs corresponding to the computing nodes;

validating the data transfer record by determining that a reputation score of the first computing node exceeds a predefined value; and invoking the smart contract to update the reputation score of the first computing node based on inspected data log of the first computing node by determining that the reputation score of the first computing node stored on the distributed ledger is updated.

2. The method of claim 1 further comprising transmitting, by the first computing node, a request to the smart contract on the distributed ledger for adding the validated data transfer record to a data log associated with the first computing node.

3. The method of claim 2 further comprising, as initial steps:

accessing, using a dummy user function, the distributed ledger to inspect the data log of the first computing node;

determining, by the dummy user function and based on the inspected data log, whether to update the reputation score of the first computing node stored on the distributed ledger; and conditional on determining to update the reputation score of the first computing node, invoking, by the dummy user function, the smart contract to update the reputation score of the first computing node based on the inspected data log.

4. The method of claim 3, wherein the data log further specifies a state of a data item involved in the previous data transfers, and determining whether to update the reputation score of the first computing node comprises:

determining, by the dummy user function, whether the state of the data item indicates a request by the data provider to revoke access to the data item, and in response to determining that the state of the data item indicates the request, determining to update the reputation score to decrease the reputation score.

5. The method of claim 3, wherein the data log further specifies a plurality of data items involved in the previous data transfers and determining whether to update the reputation score of the first computing node comprises:

determining, by the dummy user function, whether the plurality of data items meet a similarity criterion, and in response to determining that the plurality of data items meet the similarity criterion, determining to update the reputation score to decrease the reputation score.

6. The method of claim 1, wherein obtaining the data transfer record comprises monitoring, by the first computing node, a network traffic between the data provider and the data user via a data plane associated with the first computing node.

7. The method of claim 1, wherein the data transfer record specifies one or more of:

contract information between the data provider and the data user;

information describing data items involved in the data transfer;

information describing a relationship with the previous data transfers;

information describing a data usage policy;

a data transfer ID;

a data transfer timestamp;

a source and a destination IP address; and information describing a data plane performance.

8. A computing node comprising a processor and a memory, the memory storing instructions executable by the processor to implement the method according to claim 1.

9. A computer readable medium comprising executable instructions that, when executed by a processor, cause the processor to implement the method according to claim 1.

10. A computer-implemented method comprising:

receiving, by a distributed ledger, a data transfer record specifying a data transfer from a data provider to a data user via a first computing node of a network, the network including the computing nodes, the distributed ledger storing reputation scores derived based on previous data transfers associated with a plurality of computing nodes;

validating, by the distributed ledger, the data transfer record, using a smart contract on the distributed ledger by determining that a reputation score of the first computing node exceeds a predefined value, the smart contract including a self-executing application stored and executed on the distributed ledger, the distributed ledger further storing data logs specifying the previous data transfers, the data logs corresponding to the computing nodes; and updating the reputation score of the first computing node based on inspected data log of the first computing node by determining that the reputation score of the first computing node stored on the distributed ledger is updated.

11. The method of claim 10 comprising:

receiving, by the distributed ledger, a request, from the first computing node, the request being for adding the validated data transfer record to a data log associated with the first computing node; and adding, using the smart contract on the distributed ledger, the validated data transfer record to the data log associated with the first computing node.

12. The method of claim 11 further comprising, as initial steps:

providing, by the distributed ledger, to a dummy user function access to inspect the data log of the first computing node; and in response to receiving a request from the dummy user function, updating the reputation score of the first computing node based on the inspected data log.

13. The method of claim 12, wherein the data log further specifies a state for a data item associated with the previous data transfers, the state of the data item indicates a request by the data provider to revoke access to the data item, and updating the reputation score of the first computing node based on the inspected data log comprises updating the reputation score to decrease the reputation score.

14. The method of claim 12, wherein the data log further specifies a plurality of data items associated with the previous data transfers, the plurality of data items meet a similarity criterion, and updating the reputation score of the first computing node based on the inspected data log comprises updating the reputation score to decrease the reputation score.

15. The method of claim 10, wherein the data transfer record is generated by the first computing node by monitoring a network traffic between the data provider to the data user via a data plane associated with the first computing node.

16. The method of claim 10, wherein the data transfer record specifies one or more of:

contract information between the data provider and the data user;

information describing data items involved in the data transfer;

information describing a relationship with the previous data transfers;
information describing a data usage policy;
a data transfer ID;
a data transfer timestamp;
a source and a destination IP address; and
information describing a data plane performance.

17. A computing node comprising a processor and a memory, the memory storing instructions executable by the processor to implement the method according to claim 10.

18. A computer readable medium comprising executable instructions that, when executed by a processor, cause the processor to implement the method according to claim 10.

* * * * *